United States Patent
Behmlander et al.

(10) Patent No.: US 8,941,031 B2
(45) Date of Patent: Jan. 27, 2015

(54) SYSTEMS AND METHODS FOR DUAL-WEAVE WELDING

(75) Inventors: Matthew Jacob Behmlander, Metamora, IL (US); Keith Maynard Egland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 331 days.

(21) Appl. No.: 13/591,332

(22) Filed: Aug. 22, 2012

(65) Prior Publication Data

US 2014/0054273 A1 Feb. 27, 2014

(51) Int. Cl.
*B23K 31/02* (2006.01)
*B23K 26/20* (2014.01)

(52) U.S. Cl.
USPC ............ 219/136; 219/137 R; 219/137.2; 219/121.63; 219/121.64

(58) Field of Classification Search
CPC .......... B23K 26/0093; B23K 26/1423; B23K 26/1429; B23K 31/02
USPC ........ 219/121.63, 121.64, 136, 137 R, 137.2
See application file for complete search history.

(56) References Cited

U.S. PATENT DOCUMENTS

| | | | |
|---|---|---|---|
| 4,943,702 A * | 7/1990 | Richardson | 219/124.34 |
| 5,245,156 A | 9/1993 | Kamogawa et al. | |
| 6,664,507 B2 | 12/2003 | Akaba et al. | |
| 6,744,007 B2 | 6/2004 | Ono et al. | |
| 6,906,281 B2 * | 6/2005 | Musselman | 219/121.64 |
| 7,154,065 B2 | 12/2006 | Martukanitz et al. | |
| 2004/0188395 A1 | 9/2004 | Stol et al. | |
| 2005/0167403 A1 | 8/2005 | Petring | |
| 2010/0078412 A1 | 4/2010 | Diez et al. | |
| 2014/0008333 A1 * | 1/2014 | Lin et al. | 219/121.64 |
| 2014/0124486 A1 * | 5/2014 | Devers et al. | 219/121.45 |

* cited by examiner

*Primary Examiner* — Samuel M Heinrich
(74) *Attorney, Agent, or Firm* — Finnegan, Henderson, Farabow, Garrett & Dunner LLP

(57) ABSTRACT

A dual-weave welding system is disclosed. The system may have a first welding device configured to create a weld joint in a gap between two or more work pieces by moving a first welding component along a first weaving path. The system may also have a second welding device configured to create the weld joint in the gap by moving a second welding component along a second weaving path. The system may further have a controller that sends commands to control the movement of the first welding device and the second welding device.

20 Claims, 5 Drawing Sheets

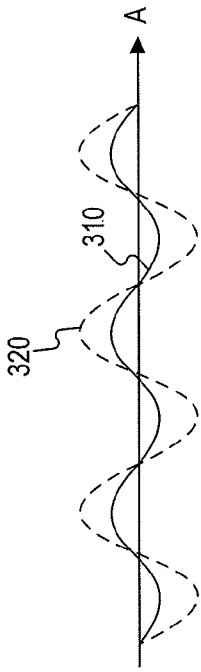
Fig. 3A
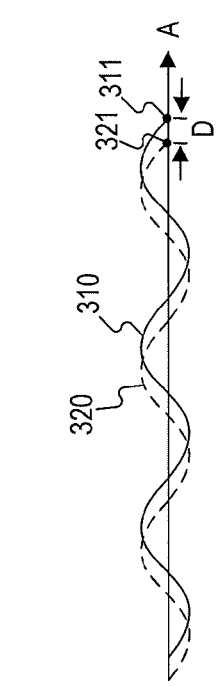
Fig. 3B
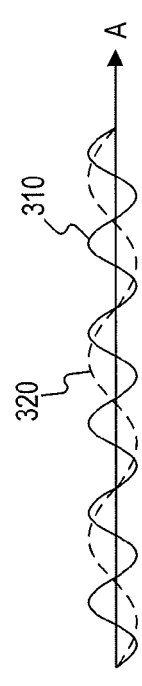
Fig. 3C
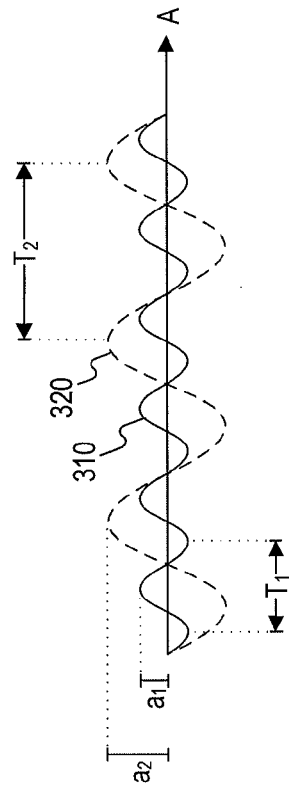
Fig. 3D
Fig. 3E
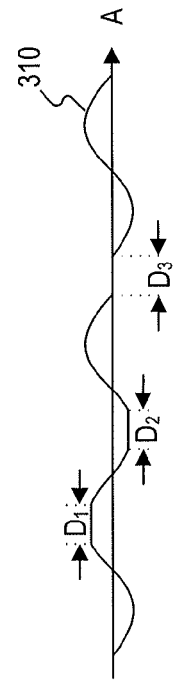
Fig. 3F

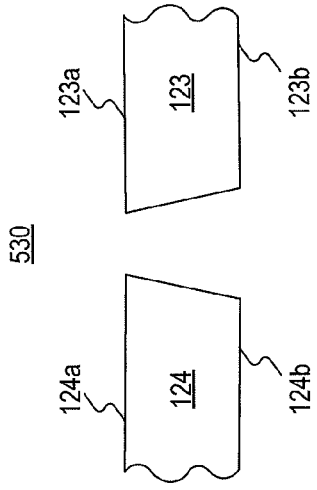
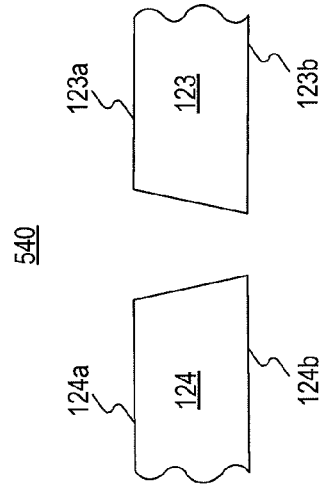
Fig. 5A   Fig. 5B
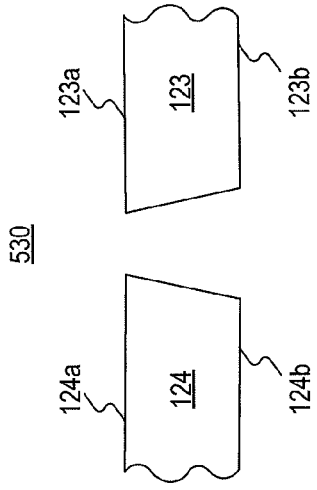
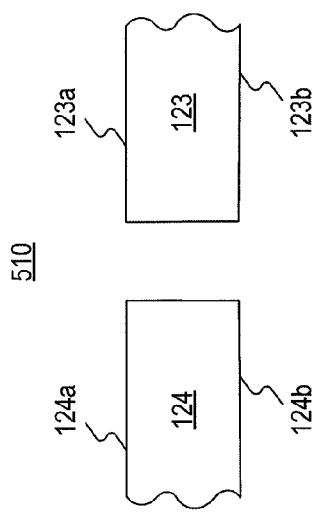
Fig. 5C   Fig. 5D

SYSTEMS AND METHODS FOR DUAL-WEAVE WELDING

TECHNICAL FIELD

The present disclosure relates generally to methods and systems for welding and more particularly, to methods and systems for welding work pieces using a dual-weave welding process.

BACKGROUND

In industry, weld joints are created by welding two or more work pieces together using welding techniques such as gas metal arc welding (GMAW), submerged arc welding, flux-cored arc welding, laser arc welding, gas tungsten arc welding, plasma arc welding, etc. For certain applications, large joint variations (i.e., the largest width of the gap between the two work pieces the welding region) may be problematic. Specifically, certain welding techniques may be unable to create a sufficient weld joint if the joint variation is greater than a few millimeters.

One potential solution to joint variation problems is to manufacture the work pieces with stricter tolerances, such that the joint variation between the two work pieces decreases. This solution, however, may increase the manufacturing time and costs of the work pieces themselves, which may result in an increased cost to the final product.

Another solution is to develop welding techniques that are capable of creating weld joints for work pieces having larger joint variation. An exemplary system that may be used to generate weld joints with increased widths is disclosed in U.S. Pat. No. 7,154,065 to Martukanitz et al. that issued on Dec. 26, 2006 (the '065 patent). The '065 patent discloses a laser-based hybrid welding system that includes a laser welding process and an arc welding process, such as GMAW. In the system of the '065 patent, the laser beam oscillates in a direction that is perpendicular to a linear path along which the weld is being made. As the laser beam oscillates, it generates a keyhole in the work piece that is surrounded by molten metal. The keyhole is filled by a consumable material fed from the arc welder.

Although the system of the '065 patent may oscillate the laser beam to create wider weld joints, the '065 patent does not disclose that the arc welder may also oscillate, or describe any relationship between an oscillation of the laser beam and the arc welder. Thus, while the system of the '065 patent may provide increased weld joint depth over traditional laser welding, it still may not achieve weld joints that are wide enough for certain applications.

The disclosed dual-weave welding systems and methods are directed to overcoming one or more of the problems set forth above and/or other problems of the prior art.

SUMMARY

In one aspect, the present disclosure is directed to a dual-weave welding system. The system may include a first welding device configured to create a weld joint in a gap between two or more work pieces by moving a first welding component along a first weaving path. The system may also include a second welding device configured to create the weld joint in the gap by moving a second welding component along a second weaving path. The system may further include a controller that sends commands to control the movement of the first welding device and the second welding device.

In another aspect, the present disclosure is directed to a method for creating a weld joint in a gap between two or more work pieces. The method may include controlling a first welding device to move a first welding component of the first welding device along a first weaving path. The method may also include controlling a second welding device to move a second welding component of the second welding device along a second weaving path.

In yet another aspect, the present disclosure is directed to another dual-weave welding system. The system may include one or more memories storing instructions. The system may also include one or more processors configured to execute the instructions to send a command to a first welding device to move a first welding component of the first welding device along a first weaving path, and send a command to a second welding device to move a second welding component of the second welding device along a second weaving path.

BRIEF DESCRIPTION OF THE DRAWINGS

FIGS. 3A-3F are pictorial illustrations of exemplary disclosed weaving paths along which welding components of the dual-weave welding system of FIG. 1 may move when creating a weld;

FIGS. 5A-5D are pictorial illustrations of exemplary gap types for gaps that may be welded by the system of FIG. 1.

DETAILED DESCRIPTION

Figure 1:
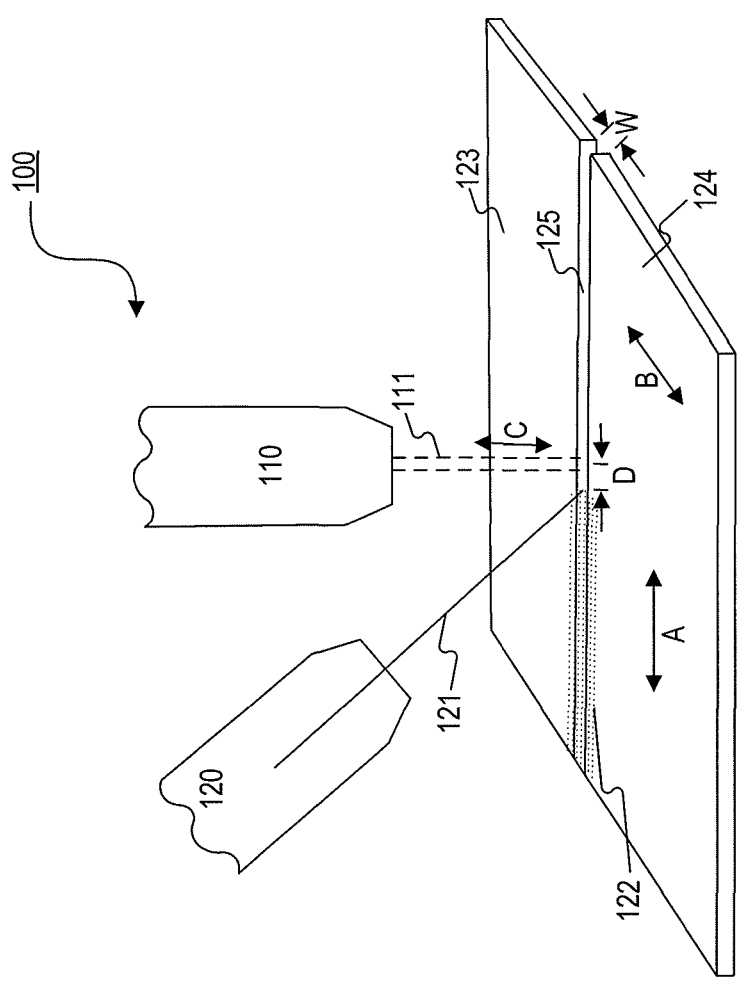
FIG. 1 is a pictorial illustration of an exemplary disclosed dual-weave welding system.

FIG. 1 illustrates an exemplary dual-weave welding system 100. Dual-weave welding system 100 may include a welding device 110 and a welding device 120 that may create a weld joint 122 in a gap 125 with a joint variation W between work piece 123 and work piece 124, in order to weld work piece 123 and work piece 124 together. Of course, the width of gap 125 may vary along the length of the gap and the joint variation W may represent that largest width of gap 125 along that length.

In exemplary embodiments discussed in greater detail below, welding device 110 and welding device 120 may work together to generate the weld by moving their respective welding components 111 and 121 along weaving paths. In certain embodiments, welding device 110 may be a laser welder and thus welding component 111 may be a laser beam, while welding device 120 may be an arc welder (e.g., gas metal arc welder, submerged arc welder, flux-cored arc welder, etc.) and the welding component 121 may be an electrode, such as a consumable electrode. However, in other embodiments, both welding device 110 and welding device 120 may be arc welders and both components 111 and 121 may be electrodes.

The weaving paths traced by welding components 111 and 121 along gap 125 are defined as lateral movement in one direction (e.g., direction A in FIG. 1) and simultaneous oscillatory movement in a different direction (e.g., direction B in FIG. 1). The weaving paths, examples of which are shown in FIG. 3 and discussed in greater detail below, may take any shape, such as a sinusoidal shape, triangular waveform, square waveform, sawtooth waveform, etc. In certain embodiments, the weaving path traced by each welding component may be periodic, i.e., it may repeat at a given time interval T (and thus have a frequency defined as f=1/T). Moreover, each weaving path may also include other characteristics, such as a constant frequency, amplitude, and or dwell time, all of which are discussed in greater detail below with regard to FIG. 3.

Welding component 111 and welding component 121 may move simultaneously along their respective weaving paths, creating weld joint 122 as they move. For example, in an embodiment where welding device 110 is a laser welder and welding device 120 is an arc welder, welding component 111 (i.e., a laser beam) may generate key holes surrounded by molten material from work pieces 123 and 124, and welding component 121 (i.e., an electrode) may be used to fill the key holes and create the weld joint. As they move along their respective weaving paths, welding component 121 may always be separated from welding component 111 by a distance D in the A direction. In certain embodiments the distance D may be controlled such that it may vary but is maintained within a range of valid distances, e.g., such that welding component 121 is a distance away from welding component 111 that is within that range. Moreover, while welding component 111 is shown as being in front of welding component 121 in the A direction, dual-weave welding system 100 may be designed such that welding component 111 is behind welding component 121 in the A direction. Thus, in an embodiment where welding component 111 is a laser beam and welding component 121 is an electrode, the laser beam may follow the electrode instead of leading it.

Welding device 110 and welding device 120 may be connected to and controlled by one or more actuating devices such as one or more robotic arms. In one embodiment, welding device 110 and welding device 120 are included on a single robotic arm capable of moving each of welding device 110 and 120 independently. In another embodiment, welding device 110 and welding device 120 are each included on separate robotic arms. In embodiments where welding device 110 is a laser welder, welding component 111 (i.e., a laser beam) may be directed along the weaving path using an optical control system, e.g., that generates oscillations in the laser beam using one or more optical control devices, such as mirrors.

Figure 2:
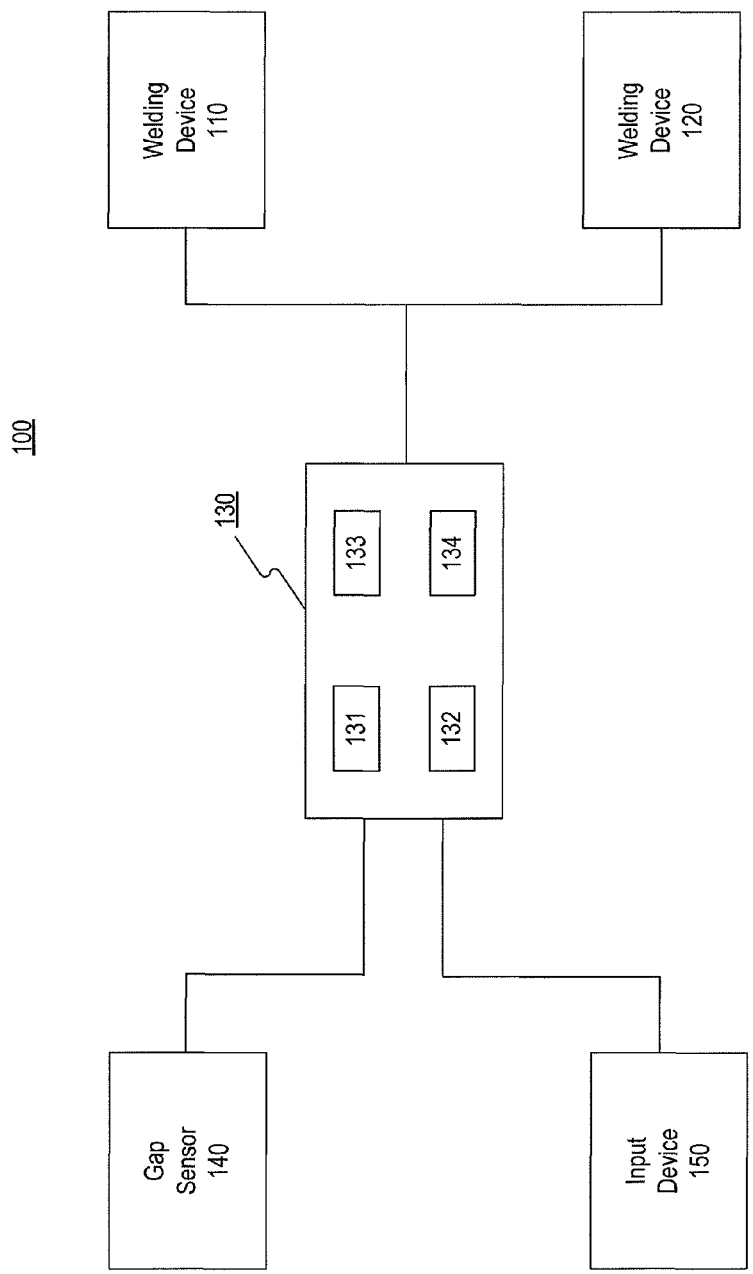
FIG. 2 is a diagrammatic illustration of the exemplary dual-weave welding system of FIG. 1.

FIG. 2 illustrates an exemplary block diagram of dual-weave welding system 100. For example, dual-weave welding system 100 may include welding devices 110 and 120, a controller 130, a gap sensor 140, and an input device 150.

Gap sensor 140 may include a device configured to determine the type of gap 125 (e.g., the geometric attributes of gap 125) formed between work piece 123 and work piece 124, as well as the width of gap 125 (e.g., the distance between work pieces). For example, gap sensor 140 may include one or more cameras configured with software to detect the edges of work pieces 123 and 124 and determine a distance between the detected edges. Gap sensor may alternatively or additionally include one or more lidar-, radar-, sonar-, etc., based systems used to detect the edges of work pieces 123 and 124 for determining the gap width and type in a similar manner. Input device 150 may be any type of input device, e.g., a keyboard, mouse, touch screen, etc., that enables a user of dual-weave welding system 100 to enter input. For example a user may enter input parameters for desired characteristics of the weaving paths of welding components 111 and 112, such as, frequency of oscillation, amplitude, etc., as discussed in greater detail below. In other embodiments, the user may enter input parameters reflective of a gap width and/or type. In still other embodiments, e.g., where dual-weave welding system 100 includes an autonomous welding system that is robotically controlled, input device 150 may enable dual-weave welding system 100 communicate with one or more controllers or processors to select parameters for characteristics of the weaving paths, e.g., without the need for a user to enter any input.

Controller 130 may include one or more communication ports 134 that enable controller 130 to receive input parameters from gap sensor 140 and/or input device 150 and to send commands to welding devices 110 and 120 in order to control the movement of welding components 111 and 121 along gap 125. Controller 130 may also include a processor 131, a storage 132, and a memory 133. Processor 131 may include one or more processing devices, such as a microprocessor from the Pentium™ or Xeon™ family manufactured by Intel™, the Turion™ family manufactured by AMD™, or any other type of processor. Storage 132 may include a volatile or non-volatile, magnetic, semiconductor, tape, optical, removable, nonremovable, or other type of storage device or computer-readable medium. Storage 132 may store programs and/or other information, such as dual-weave welding control programs to generate commands used to control welding devices 110 and 120 such that welding components 111 and 121 create weld joints by tracing weaving paths along gaps between two or more work pieces, as discussed in greater detail below. Memory 133 may include one or more storage devices configured to store information used by controller 130 to perform certain functions related to disclosed embodiments.

In one embodiment, memory 133 may include one or more dual-weave welding control programs or subprograms loaded from storage 132 or elsewhere that, when executed by processor 131, perform various procedures, operations, or processes consistent with the disclosed embodiments. For example, memory 133 may include one or more programs that enable controller 131 to, among other things, send a command to welding device 110 to move welding component 111 along a first weaving path and send a command to welding device 120 to move welding component 121 along a second weaving path.

FIGS. 3A-3F are pictorial illustrations of exemplary disclosed weaving paths along which welding device 110 and 120 may move welding components 111 and 121 when creating a weld joint. While the exemplary weaving paths shown in FIGS. 3A-3F are all sinusoidal, the weaving paths can take any shape. For example, the weaving paths may be a triangular or square waveform, a sawtooth waveform, or any other type of waveform that moves welding components 111 and 121 along the A direction of gap 125 while generating some oscillatory movement in a direction other than the A direction, e.g., the B direction and/or the C direction as shown in FIG. 1. Moreover, the ratio between the amplitude of the wave forms shown in FIGS. 3A-3F and the distance traveled in the A direction is exemplary only. That is, the ratio of the amplitude of the weaving paths to the distance traveled in the A direction may be increased, e.g., such that the waveforms in FIGS. 3A-3F appear as though they have been squeezed together, or the ratio may be decreased, such that the waveforms appear as though they have been stretched out.

FIGS. 3A-3F illustrate exemplary embodiments of weaving paths 310 and 320 traveled by welding components 111 and 121, respectively, when creating a weld joint, and also illustrate exemplary relationships between the relative frequencies, amplitudes, and phase shifts of those weaving paths. For example, with reference to FIG. 3E, weaving path 310 may have an amplitude $a_1$ measured from the centerline of A (which may be, e.g., the center of gap 125) to the peak (or valley) of weaving path 310. Likewise, weaving path 310 may have an amplitude $a_2$ measured in a similar manner. Weaving path 310 may also have a frequency $f_1$ measured as $1/T_1$, where $T_1$ is the time it takes welding component 111 to travel one full cycle of weaving path 310 (i.e., $T_1$ is the period of weaving path 310). Likewise, weaving path 320 may have a frequency $f_2=1/T_2$ measured in a similar manner.

FIG. 3A illustrates an embodiment where weaving paths 310 and 320 have the same amplitude, frequency and phase. Thus, weaving path 320 is not shown in FIG. 3A because it is completely overlapped by weaving path 310. As discussed, welding component 121 may be separated by a distance D in the A direction from welding component 111. Thus, at a given time, welding component 121 may be at a location 321 while welding component 111 may be at a location 311. As the welding components move along weaving paths 310 and 320, the location 321 of welding component 121 may follow the location 311 of welding component 111.

FIG. 3B illustrates an embodiment where weaving paths 310 and 320 have the same amplitude and frequency, but are offset in phase. In certain embodiments, the offset may be set equal to the distance D between welding component 111 and welding component 121. Thus, in these embodiments, as shown in FIG. 3B, welding component 121 may be located at location 321 that is at the same position in the direction perpendicular to the A direction (e.g., the B direction) as location 311 of welding component 111. For example, FIG. 3B shows location 311 and location 321 as both being located on the A-axis at the same time.

In certain embodiments, the amplitude, frequency, and/or phase of the weaving paths 310 and 320 may differ from each other. For example, FIG. 3C illustrates an embodiment where the frequency of weaving path 310 (e.g., the frequency of oscillation of the laser beam, in certain embodiments) is greater than the frequency of weaving path 320 (e.g., the frequency of oscillation of the electrode). While FIG. 3C illustrates weaving path 310 having a frequency that is roughly twice that of weaving path 320, any relationship may exist between the frequencies, consistent with disclosed embodiments. For example, in embodiments where welding component 111 is a laser beam and welding component 121 is an electrode, the frequency of oscillation of weaving path 310 may be set to be less than 3.5 Hz and the frequency of oscillation of weaving path 320 may be set to be greater than or equal to 4 Hz. In one exemplary embodiment, the frequency of oscillation of weaving path 310 may be set to be between 0.9 Hz and 2.0 Hz and the frequency of oscillation of weaving path 320 may be set to be between 4 Hz and 20 Hz.

Likewise, FIG. 3D illustrates an embodiment where the amplitude of weaving path 320 is greater than the amplitude of weaving path 310. The amplitudes of the weaving paths may be set based on one or more characteristics of gap 125, e.g., gap width, gap type, etc. While weaving path 320 is shown as having a larger amplitude than weaving path 310, in certain embodiments, weaving path 310 may have a larger amplitude than weaving path 320.

Weaving paths 310 and 320 may include any combination of relative amplitude, frequency, and phase shift. For example, FIG. 3E illustrates another exemplary embodiment where weaving path 320 includes both a larger amplitude and a smaller frequency than weaving path 310.

Moreover, weaving paths 310 and 320 may also include dwell times which may be the same or may be different from one another. Dwell time may be defined as the time a welding component pauses and maintains its location in at least one direction (e.g., direction B as shown in FIG. 1) at a peak, valley, and/or center of the weaving path. For example, when welding component 121 moves along weaving path 320, it may pause for a brief amount of time (e.g., less than 0.5 seconds) at each peak, valley, and/or center of the weaving path. FIG. 3F shows the effects of exemplary dwell times on weaving path 310. For example, weaving path 310 may include a dwell time at the peak of the weaving path such that welding component 111 maintains its position in a direction perpendicular to the A direction for a distance $D_1$. Likewise, weaving path 310 may include dwell times at the valley and/or center of the weaving path such that welding component 111 maintains its position in a direction perpendicular to the A direction for distances $D_2$ and $D_3$, respectively. Moreover, while only weaving path 310 is shown for simplicity, weaving path 320 may also include dwell times as discussed above with regard to weaving path 310. If welding component 121 is an electrode used in an arc welder, for example, dwell times may ensure that the toes of the weld (i.e., the edges of the weld) are formed properly. In an embodiment where welding device 120 is an arc welder and welding device 110 is a laser welder, the dwell times along weaving path 310 may be less than the dwell times along weaving path 320. For example, in one embodiment, the dwell times along path 310 may be zero and the dwell times along weaving path 320 may be some non-zero number.

Figure 4:
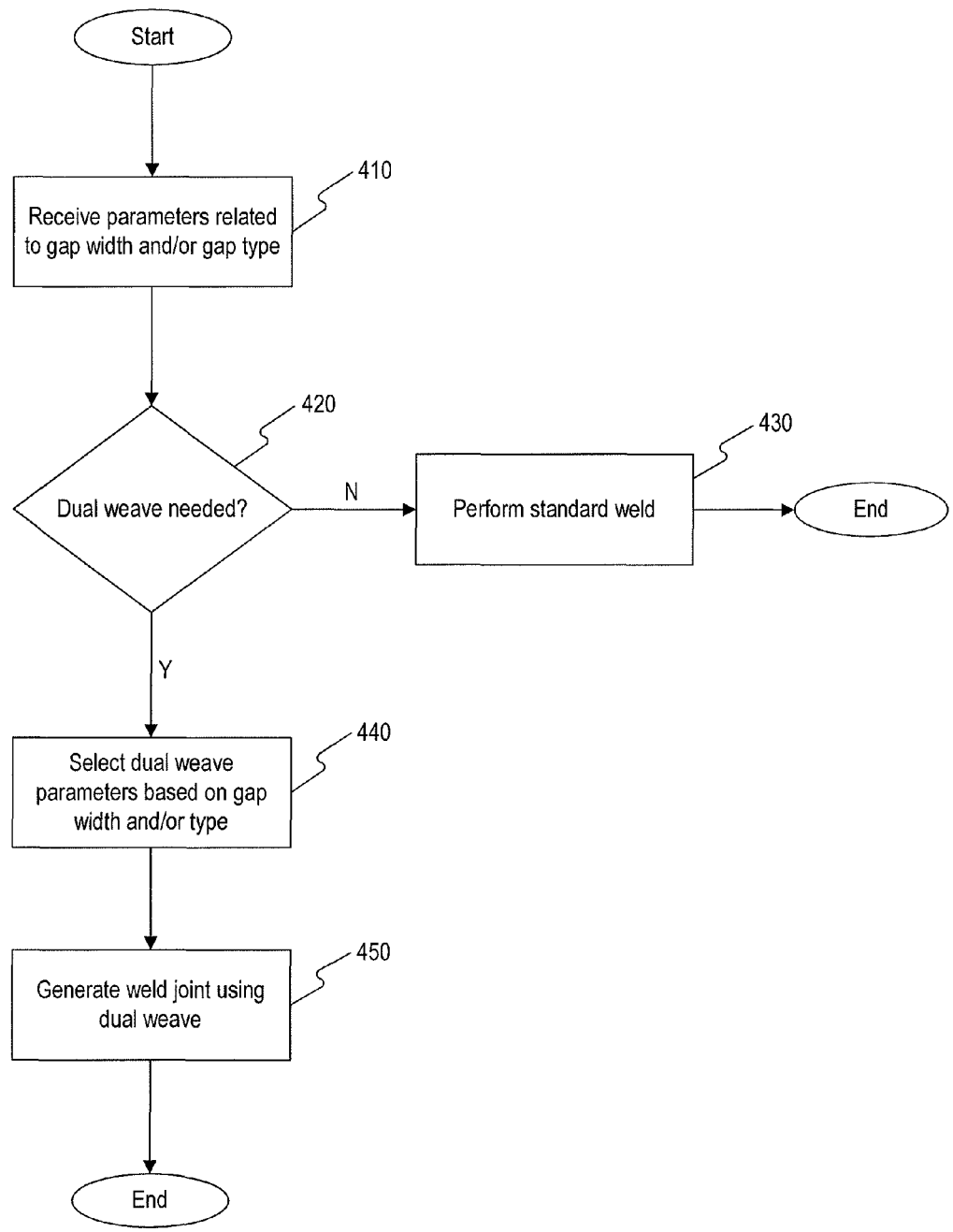
FIG. 4 is an exemplary disclosed method that may be performed by the dual-weave welding system of FIG. 1.

FIG. 4 is an exemplary disclosed method that may be performed by the dual-weave welding system 100 of FIG. 1. For example, dual-weave welding system 100 may receive parameters related to one or more characteristics of gap 125, such as gap width and/or gap type, e.g., from gap sensor 140 and/or via input device 150 (step 410). Dual-weave welding system 100 may receive the parameters at a time before the welding process begins or may receive the parameters in real-time during the welding process.

FIGS. 5A-5D are pictorial illustrations of exemplary gap types, characteristics of which may be sensed by gap sensor 140 and/or identified by a user and entered via input device 150. For example, FIGS. 5A and 5B illustrate exemplary gap types where a distance between top face 123a and top face 124a is substantially the same as a distance between bottom face 123b and bottom face 124b, except that in first gap type 510 of FIG. 5A the edges are substantially perpendicular to the faces of work pieces 123 and 124, while in second gap type 520 of FIG. 5B, the edges are not substantially perpendicular. FIGS. 5C and 5D illustrate a third gap type 530 and a fourth gap type 540 where a distance between top face 123a and top face 124a is different than a distance between bottom face 123b and bottom face 124b.

Dual-weave welding system 100 may determine whether it is necessary to perform a dual-weave weld, e.g., based on the gap type and/or gap width (step 420). For example, dual-weave welding system 100 may determine that a dual-weave weld is necessary only for gaps having a gap width that exceeds a particular threshold gap width and/or for gaps that are of a particular gap type. The threshold gap width and/or the gap types requiring a dual-weave weld may be set based on system requirements and constraints, for example. If dual-weave welding system 100 determines that a dual weave is not needed (step 420, N), then dual-weave welding system 100 may create a standard weld joint (step 430). That is, dual-weave welding system 100 may create a weld joint without implementing the dual weave process discussed above. For example, dual-weave welding system 100 may create a weld joint using a single arc welder that travels along gap 125 without a weaving path. Or, dual-weave welding system 100 may create a weld joint using a standard hybrid welding technique that uses both a laser welder and an arc welder without weaving.

If dual-weave welding system 100 determines that a dual weave is needed (step 420, Y), then dual-weave welding system 100 may select dual weave parameters based on the received gap characteristics, such as gap width and type (step 440). For example, dual-weave welding system 100 may set one or more of the amplitudes, frequencies, dwell times, and phase shifts of weaving paths 310 and 320 based on the received gap characteristics. In one example, the amplitudes of weaving paths 310 and 320 may both be set such that they are greater than or equal to the joint variation (i.e., largest width) of gap 125.

After setting the dual-weave parameters, dual-weave welding system 100 may generate the weld joint using the weaving paths defined by the dual weave parameters selected in step 440 (step 450). That is, dual-weave welding system 100 may control welding device 110 to move welding component 111 along weaving path 310 and may control welding device 120 to move welding component 121 along weaving path 320 to create the weld joint.

Industrial Applicability

The disclosed dual-weave welding system 100 may be applicable to any welding environment that may encounter variable and/or large gaps between work pieces. The disclosed dual-weave welding system 100 may control two welding devices to move their respective welding components (e.g., one laser and one electrode or two different electrodes) along two weaving paths while creating the weld joint to weld together the work pieces. This may enable the dual-weave welding system 100 to create sufficiently strong weld joints in gaps that are too wide for traditional welding systems to do so.

It will be apparent to those skilled in the art that various modifications and variations can be made to the disclosed dual-weave welding system. Other embodiments will be apparent to those skilled in the art from consideration of the specification and practice of the disclosed dual-weave welding system. It is intended that the specification and examples be considered as exemplary only, with a true scope being indicated by the following claims and their equivalents.

What is claimed is:

1. A dual-weave welding system, comprising:
   a first welding device configured to create a weld joint in a gap between two or more work pieces by moving a first welding component along a first weaving path; and
   a second welding device configured to create the weld joint in the gap by moving a second welding component along a second weaving path.

2. The dual-weave welding system of claim 1, wherein
   the first welding device is a laser welding device and the first welding component is a laser beam; and
   the second welding device is an arc welding device and the second welding component is a consumable electrode.

3. The dual-weave welding system of claim 2, wherein
   the first welding device is further configured to create the weld joint by moving the first welding component along the first weaving path with a first frequency of oscillation; and
   the second welding device is further configured to create the weld joint by moving the second welding component along the second weaving path with a second frequency of oscillation that is less than the first frequency of oscillation.

4. The dual-weave welding system of claim 3, wherein the first frequency of oscillation is between 0 Hz and 3.5 Hz and the second frequency of oscillation is greater than or equal to 4 Hz.

5. The dual-weave welding system of claim 1, wherein
   the first welding device is an arc welding device and the first welding component is a consumable electrode; and
   the second welding device is an arc welding device and the second welding component is a consumable electrode.

6. The dual-weave welding system of claim 1, wherein the first weaving path has a first amplitude that is less than a second amplitude of the second weaving path.

7. The dual-weave welding system of claim 1, further comprising:
   a controller configured to:
      receive input parameters defining a first frequency and a first amplitude of the first weaving path and a second frequency and a second amplitude of the second weaving path;
      send a command to the first welding device to move the first welding component along the first weaving path having the first frequency and the first amplitude; and
      send a command to the second welding device to move the second welding component along the second weaving path having the second frequency and the second amplitude.

8. The dual-weave welding system of claim 1, further comprising:
   a controller configured to:
      receive input parameters indicative of a size of the gap between the two or more work pieces;
      determine a first characteristic of the first weaving path and a second characteristic of the second weaving path based on the size of the gap between the two or more work pieces;
      send a command to the first welding device to move the first welding component along the first weaving path having the first characteristic; and
      send a command to the second welding device to move the second welding component along the second weaving path having the second characteristic.

9. A method for creating a weld joint in a gap between two or more work pieces, the method comprising:
   controlling a first welding device to move a first welding component of the first welding device along a first weaving path; and
   controlling a second welding device to move a second welding component of the second welding device along a second weaving path.

10. The method of claim 9, wherein
    the first welding device is a laser welding device and the first welding component is a laser beam; and
    the second welding device is an arc welding device and the second welding component is a consumable electrode.

11. The method of claim 10, further comprising
    controlling the first welding device to move the first welding component along the first weaving path with a first frequency of oscillation; and
    controlling the second welding device to move the second welding component along the second weaving path with a second frequency of oscillation that is less than the first frequency of oscillation.

12. The method of claim 11, wherein the first frequency of oscillation is between 0 Hz and 3.5 Hz and the second frequency of oscillation is greater than or equal to 4 Hz.

13. The method of claim 9, wherein
    the first welding device is an arc welding device and the first welding component is a consumable electrode; and
    the second welding device is an arc welding device and the second welding component is a consumable electrode.

14. The method of claim 9, wherein the first weaving path has a first amplitude that is less than a second amplitude of the second weaving path.

15. The method of claim 9, further comprising:

receiving input parameters defining a first frequency and a first amplitude of the first weaving path and a second frequency and a second amplitude of the second weaving path;

sending a command to the first welding device to move the first welding component along the first weaving path having the first frequency and the first amplitude; and sending a command to the second welding device to move the second welding component along the second weaving path having the second frequency and the second amplitude.

16. The method of claim 9, further comprising:

receiving input parameters indicative of a size of the gap between the two or more work pieces;

determining a first characteristic of the first weaving path and a second characteristic of the second weaving path based on the size of the gap between the two or more work pieces;

sending a command to the first welding device to move the first welding component along the first weaving path having the first characteristic; and sending a command to the second welding device to move the second welding component along the second weaving path having the second characteristic.

17. A dual-weave welding system comprising:

one or more memories storing instructions; and one or more processors configured to execute the instructions to:

send a command to a first welding device to move a first welding component of the first welding device along a first weaving path; and send a command to a second welding device to move a second welding component of the second welding device along a second weaving path.

18. The dual-weave welding system of claim 17, wherein the first welding device is a laser welding device and the first welding component is a laser beam; and the second welding device is an arc welding device and the second welding component is a consumable electrode.

19. The dual-weave welding system of claim 17, the one or more processors further configured to execute the instructions to:

receive input parameters defining a first frequency and a first amplitude of the first weaving path and a second frequency and a second amplitude of the second weaving path;

send a command to the first welding device to move the first welding component along the first weaving path having the first frequency and the first amplitude; and send a command to the second welding device to move the second welding component along the second weaving path having the second frequency and the second amplitude.

20. The dual-weave welding system of claim 17, the one or more processors further configured to execute the instructions to:

receive input parameters indicative of a size of the gap between the two or more work pieces;

determine a first characteristic of the first weaving path and a second characteristic of the second weaving path based on the size of the gap between the two or more work pieces;

send a command to the first welding device to move the first welding component along the first weaving path having the first characteristic; and send a command to the second welding device to move the second welding component along the second weaving path having the second characteristic.

* * * * *